C. D. PETTIS.
BRAKE SHOE.
APPLICATION FILED AUG. 3, 1912.

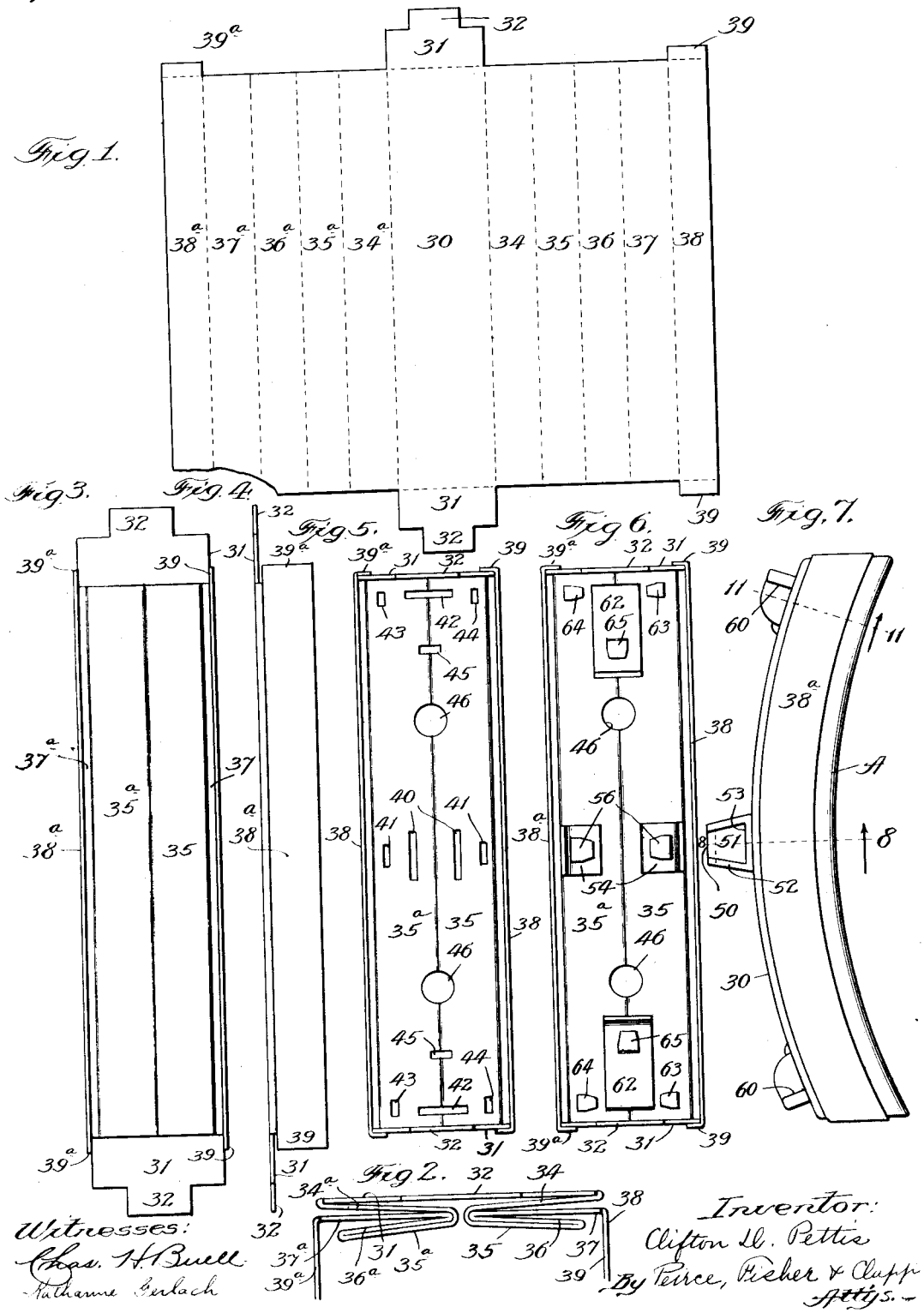

1,065,717.

Patented June 24, 1913.
4 SHEETS—SHEET 2.

Witnesses:
Chas. H. Buell.
Katharine Gerlach

Inventor:
Clifton D. Pettis
By Peirce, Fisher & Clapp
Attys.

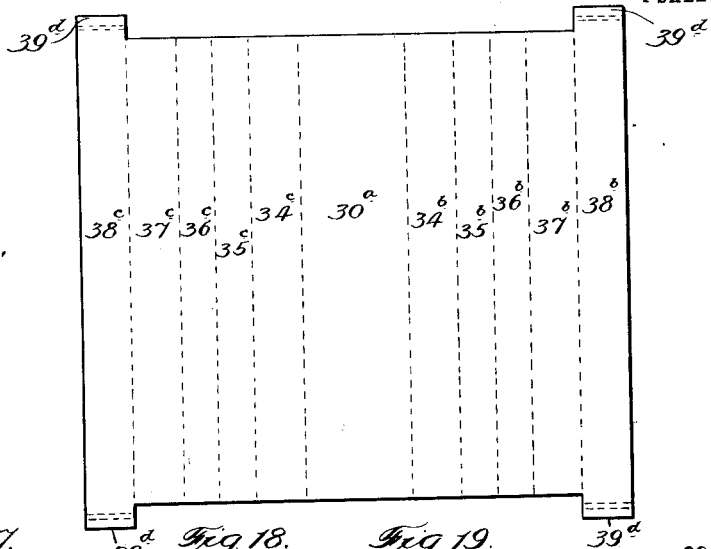
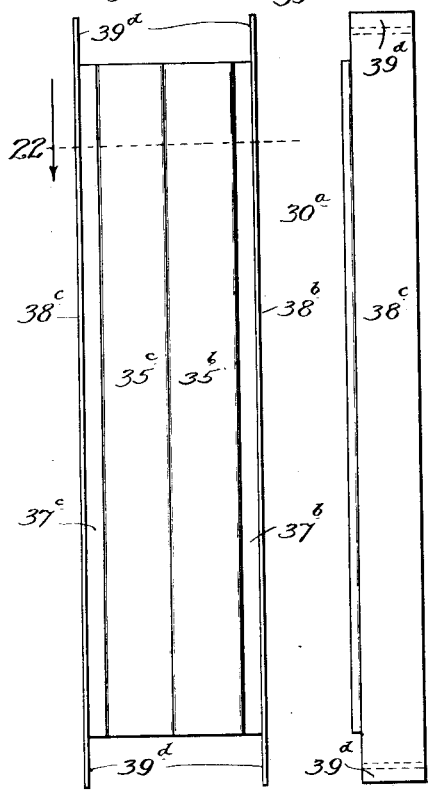
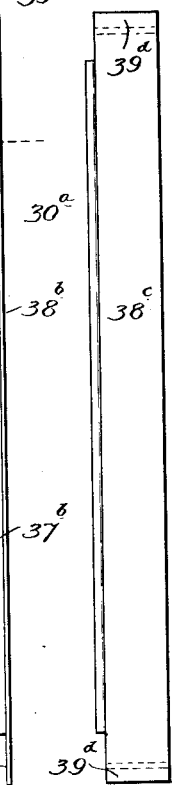
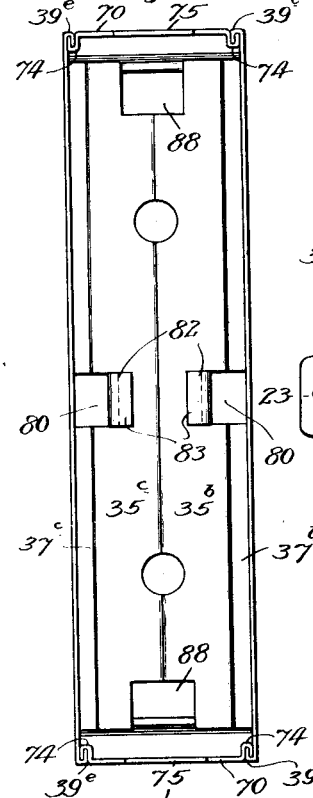
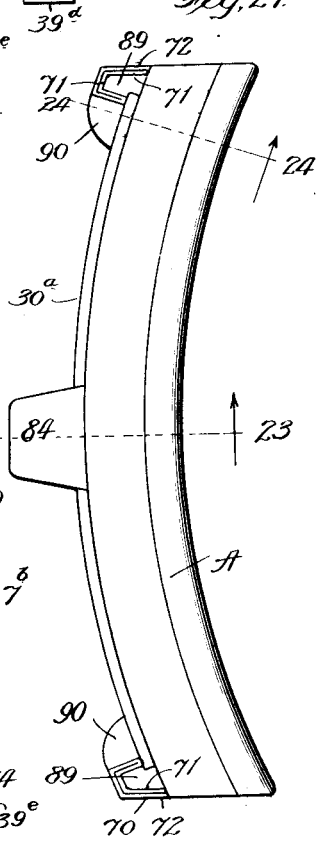
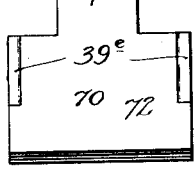

C. D. PETTIS.
BRAKE SHOE.
APPLICATION FILED AUG. 3, 1912.
1,065,717.
Patented June 24, 1913.
4 SHEETS—SHEET 4.
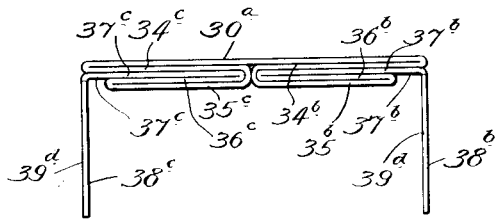
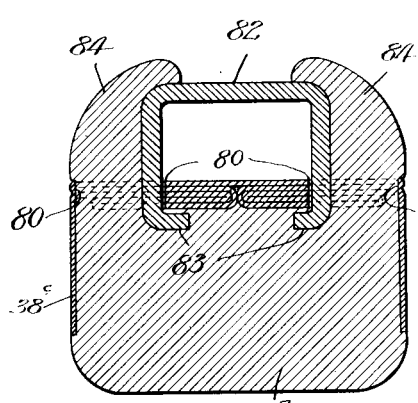
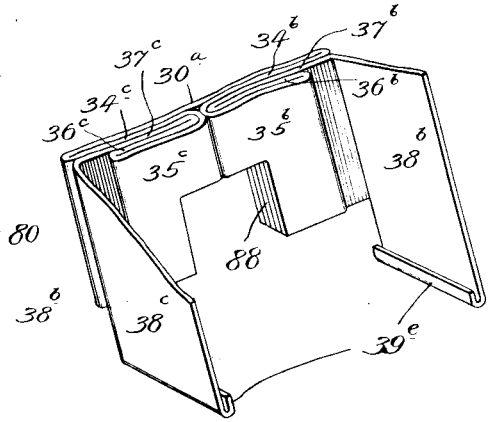
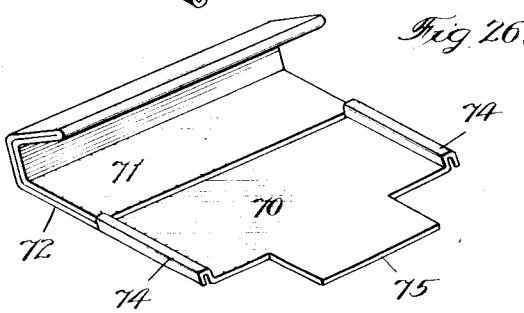
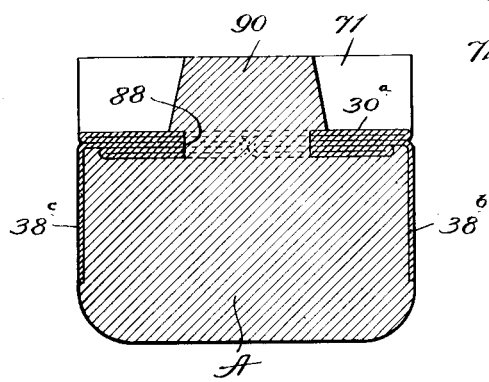
Witnesses:
Inventor:
Clifton D. Pettis
By Pierce, Fisher & Clapp
Attys.

UNITED STATES PATENT OFFICE.

CLIFTON D. PETTIS, OF CHICAGO, ILLINOIS.

BRAKE-SHOE.

1,065,717. Specification of Letters Patent. Patented June 24, 1913.

Application filed August 3, 1912. Serial No. 713,177.

*To all whom it may concern:*

Be it known that I, CLIFTON D. PETTIS, a citizen of the United States, and a resident of the city of Chicago, county of Cook, and State of Illinois, have invented certain new and useful Improvements in Brake-Shoes, of which I do declare the following to be a full, clear, and exact description, reference being had to the accompanying drawings, forming part of this specification.

This invention relates more particularly to that class of brake shoes for railway cars in which provision is made for strengthening the backs of the shoes, so that as the cast metal bodies of the shoes become worn in service, the danger of the breakage of the shoes or their falling away from the brake head will be obviated.

The invention consists in the features of novelty hereinafter described, illustrated in the accompanying drawings and particularly pointed out in the claims at the end of this specification.

Figure 9:
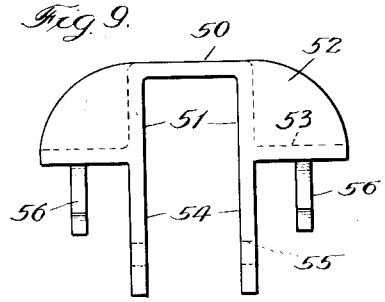
Figure 10:
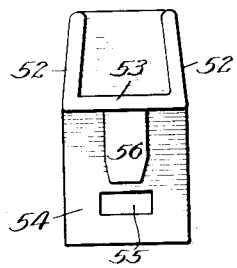
Figure 11:
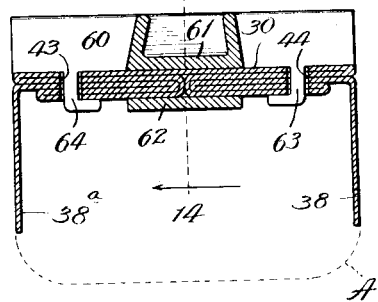
Figure 8:
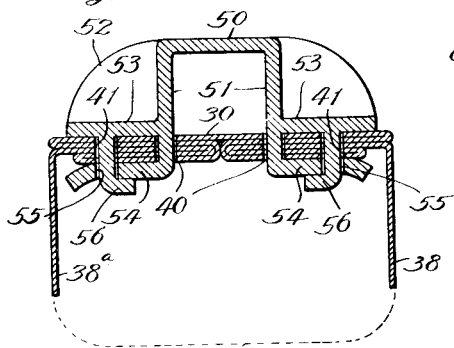
Figure 13:
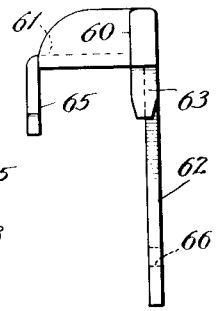
Figure 12:
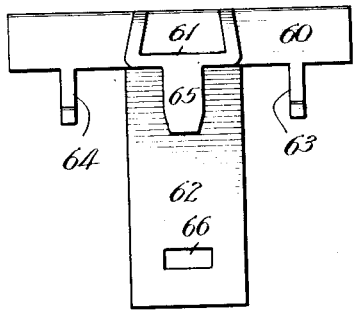
Figure 14:
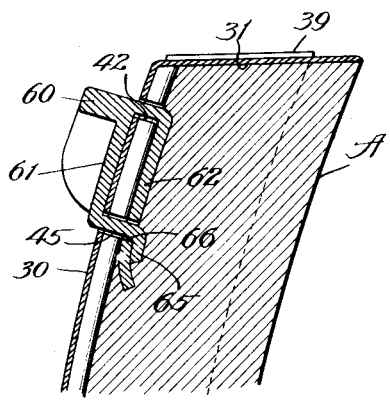
Figure 15:
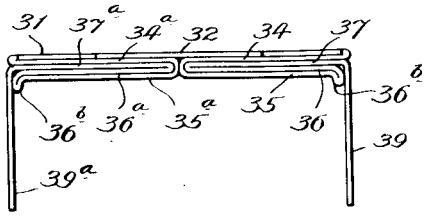

Figure 1 is a view of the blank from which my improved form of reinforcing back for the shoe will be made. Fig. 2 is an end view upon an enlarged scale of the blank after it has been folded, but showing the folds separated for better illustration. Fig. 3 is an inner face view of the blank after the body portion has been folded, but with the ends distended. Fig. 4 is a view in side elevation of the reinforcing back shown in Fig. 3. Fig. 5 is an inner face view showing the back completely folded and punched to form the holes for admitting the attaching lugs and with holes for permitting the cast metal to be poured into the back or shell. Fig. 6 is a view similar to Fig. 5 but showing the parts after the attaching lugs have been connected thereto. Fig. 7 is a view in side elevation of the completed shoe. Fig. 8 is a view in cross section upon an enlarged scale on line 8—8 of Fig. 7. Fig. 9 and Fig. 10 are detail views in elevation of the central attaching lug. Fig. 11 is a view in cross section, upon an enlarged scale, on line 11—11 of Fig 7. Figs 12 and 13 are detail views in elevation of one of the end lugs. Fig. 14 is an enlarged view in central longitudinal section on lines 14—14 of Fig. 11. Fig. 15 is an end view showing a slightly modified form of reinforcing back. Fig. 16 is a view of a blank for forming a modified form of reinforcing back embodying features of my invention. Fig. 17 is an inner face view and Fig. 18 is a view in side elevation of a back made from the blank shown in Fig. 16 before the ends have been folded. Fig. 19 is an inner face view of the modified form of back after its ends have been folded and the back has been punched and after the separate end plates have been connected thereto and the ductile metal of the center lug set in place. Fig. 20 is a detail view of parts shown in Fig. 19. Fig. 21 is a view in side elevation of the finished brake shoe embodying the modified form of my invention. Fig. 22 is an end elevation, upon an enlarged scale, of the back folded to the extent shown in Figs. 17 and 18. Fig. 23 is a view in cross section on line 23—23 of Fig. 21. Fig. 24 is a view in cross section on line 24—24 of Fig. 21. Fig. 25 is a detail perspective view (from the inner side) of the reinforcing back after it has been folded and punched. Fig. 26 is a detail perspective view of one of the end lugs with the end plate formed in piece therewith. In Figs. 8 and 11, the cast metal body of the shoe is indicated in dotted lines.

The body portion A of my improved brake shoe is preferably formed of cast metal, to which body the reinforcing back is united in the casting operation. In the embodiment of the invention shown upon Sheets 1 and 2 of the drawings, the reinforcing back is formed from a ductile metal plate cut in the shape of the blank shown in Fig. 1 and subsequently folded, as will presently appear. The blank shown in Fig. 1 comprises a central portion 30 from which project the end portions 31, preferably formed with projecting tongues 32. The blank shown in Fig. 1 will be folded, upon the dotted lines indicated, to form the plies or sections 34, 35, 36 and 37 and side wall 38 on one side and to form the corresponding plies or layers 34ª, 35ª, 36ª and 37ª and side wall 38ª on the opposite side of the central portion 30. At the end of the walls or sections 38 and 38ª are formed the lips or projections 39 and 39ª. In forming the back, the blank shown in Fig. 1 will first be folded longitudinally, as shown in Figs. 2, 3 and 4 of the drawings. That is to say, the section 34 will be turned in toward the center of the back, the section 35 bent outwardly, and the sections 36 and 37 will be folded in between the sections 34 and 35, after which the section 38 will be turned at right angles to the section 37. Similarly, the sections 34ª, 35ª, 36ª, 37ª and 38ª, will be folded, as shown in Fig. 2, and the end portions 31 of the center section 30 and the lips 39 and 39ª of the sections 38 and 38ª will be distended, as shown in Figs. 3 and 4. It will be understood, of course, that after the sections have been folded, as indicated in Fig. 2, the top 30 and the sections 34, 35, etc., will be rolled or compressed firmly together, after which the end portions 31 will be turned at substantially right angles to the central section 30, and the lips 39 and 39ª will be folded at right angles to the end portions 31 and pressed thereon. If desired, the lips 39 and 39ª may be electrically or otherwise welded to the end portions 31. The reinforcing back will then be in the form shown in Fig. 5 of the drawings.

I prefer to use with my improved reinforcing back the form of center lug described and claimed in application, Serial No. 711,304, filed by me in the United States Patent Office, July 24, 1912, and I prefer to employ end lugs such as are described and claimed in an application, Serial No. 711,305, filed by me in the United States Patent Office, July 24, 1912, although, obviously, my improved reinforcing back may be employed in connection with center and end lugs of any suitable construction. I do not wish to be understood as claiming in the present application the specific construction of attaching lugs set forth in said above mentioned applications.

When attaching lugs, such as set forth in my above mentioned application, are used, the reinforcing back will be formed about its center with slots or holes 40, 40 and 41, 41, and adjacent its ends with slots or holes 42, 43, 44 and 45. The back will also be formed with holes 46 through which will be poured the cast metal whereof the body of the shoe will be formed.

My improved center lug, as shown in Figs. 9 and 10 of the drawings, comprises a crown 50 from which depend side walls 51, from which project brace walls 52, between which brace walls extend the base portions 53. From the side walls 51 extend the locking members 54 that are provided with slots 55 adjacent their ends, and from the base portions 53 depend the locking members 56. In attaching the center lug to the back, the locking members 54 will be passed through the slots 40 and the locking members 56 will be passed through the slots 41 of the back, after which the locking members 54 will be turned outwardly, the locking members 56 will be passed through the holes 55 in the locking members 51 and the free ends of the locking members 56 will be bent inwardly, as shown in Fig. 8 of the drawings.

Each of the end lugs is shown as comprising a transverse wall 60 from which projects inwardly a central portion 61. From the central portion of the transverse wall 60 extends a locking member 62, and on opposite sides of the locking member 62 are the locking members 63 and 64. From the inner end of the central portion 61 of the lug extends the locking member 65. A slot 66 is formed in the locking member 62 adjacent its free end. In applying each of the end lugs to the reinforcing back of the shoe, the locking members 62, 63, 64 and 65 will be inserted through the slots or openings 42, 43, 44 and 45 of the reinforcing back, after which the locking member 62 will be bent toward the center of the shoe, the locking members 63 and 64 will be bent laterally, the locking member 65 will be passed through the slot 66 of the locking member 62, and its free end will be bent inwardly, as shown in Fig. 14 of the drawings. In Fig. 6 the reinforcing back is shown after the attaching lugs have been fixed thereto, in manner last described.

After the attaching lugs have been connected to the reinforcing back, the back will be placed within a shallow mold upon the bottom of which the tongues 32 will rest. The cast metal of which the body portion A of the shoe is to be formed, will then be poured through the openings 46 in the back and will fill the shallow pan that comprises the back. Preferably, the side and end walls of the back will extend more than half way from back to front of the body of the shoe and in the preferred form of the invention to a slight distance from the wearing face of the body of the shoe. The ductile metal plate of which the reinforcing back or shell of the shoe is formed will be a thin plate (preferably about $\frac{1}{32}$nd of an inch in thickness) and, when the cast metal is poured into the shell, it will firmly adhere to and coalesce therewith so that the shell forms in effect a tough skin or armor about the top and side and end portions of the cast metal body of the shoe. At the same time the cast metal flows about and adheres to the ends of the locking members of the attaching lugs and effectively serves to guard against any possibility of the withdrawal of the lugs. It will be understood that after the reinforcing back has been brought to the shape shown in Figs. 3 and 4 of the drawings, it will, by means of a suitable press, be given the requisite longitudinal curve, as shown in Fig. 7.

In Fig. 15 of the drawings I have shown a slightly modified form of the reinforcing back. This form differs from that hereinbefore described only in the particular that the sections 35 and 36 and 35ª and 36ª are made somewhat wider, so that they may be bent downwardly, as shown at 36ᵇ. The purpose of this construction is to give a channel-like interior surface to the inner face of the back and thereby increase its strength.

In the modified form of the invention illustrated on Sheets 3 and 4 of the drawings, the main body of my improved reinforcing back is formed from the blank shown in Fig. 16 of the drawings. This blank comprises a central portion 30ª that will be folded to form the sections or plies 34ᵇ, 35ᵇ, 36ᵇ, 37ᵇ and wall 38ᵇ on one side and corresponding sections or plies 34ᶜ, 35ᶜ, 36ᶜ, 37ᶜ and wall 38ᶜ on the opposite side of the central section or portion 30ª. The outer sections 38ᵇ and 38ᶜ will be formed at their ends with lips 39ᵈ that will be folded to form reverted flanges 39ᵉ, as shown in Figs. 19 and 25 of the drawings. In making this modified form of my improved reinforcing back, the ductile metal blank shown in Fig. 16 will be folded upon the dotted lines there shown, so that the several sections or plies shall rest one upon the other, as clearly indicated in Fig. 22 of the drawings, the sections 38ᵇ and 38ᶜ forming the side walls of the back or shell extending at right angles to the sections 37ᵇ and 37ᶜ. The back will then be in the form shown in Figs. 17, 18 and 22 of the drawings, after which the lips 39ᵈ will be bent to form the reverted flanges 39ᵉ, as shown in Fig. 19. The ends of the back or shell in this modified form of my invention are shown as formed of ductile metal plates 70 (see Figs. 19 and 26) that are integral with the transverse walls of the end lugs of the shoe. Each of these transverse walls (see Fig. 26) is preferably formed of two thicknesses 71 and 72 of ductile metal folded one upon the other, as shown in Fig. 26, to form the arched wall extending from side to side of the shoe. At each side of each of the end plates 70 is formed a channel shaped flange 74 adapted to interlock with the reverted flange 39ᵉ (see Figs. 19 and 25) at the ends of the side walls or sections 38ᵇ and 38ᶜ and, preferably, each of the end plates 70 is formed with a tongue 75 adapted to rest upon the bottom of the mold when the back or shell is set therein.

The central portion of my improved reinforcing back is formed with cut-away spaces 80 adapted to permit the cast metal to flow therethrough in forming or reinforcing the center lug of the shoe. Preferably, the center lug comprises a ductile metal, U-shaped part 82, the side walls of which will extend through the openings 80 in the back, the free ends 83 of this lug being turned inwardly to engage the back and prevent the withdrawal of the lug. The side walls of the center lug 82 (see Figs. 21 and 23) will be reinforced by bodies 84 of cast metal integral with the body portion A of the shoe. The end portions of the back, shown on Sheets 3 and 4, are formed with openings 88 through which cast metal will flow, as at 89 (see Fig. 21) into the hollow, transverse wall 71 of the end lug and will flow also at the inner side of the central portion of the end lug to form the inwardly extending member 90 of the lug.

It will be understood that the center lug 82 and the end plates 70 and end lugs will be attached to the body portion of the back or shell, as shown in Fig. 19, before the back or shell is placed within the mold. When the cast metal is poured into the mold, it will firmly unite with the back or shell and will interlock with the ends 83 of the center lug, as well as flow around and adhere to the side walls of such lug. So, also, at the ends of the shoe, the cast metal will adhere to the end plates and end lug and rigidly hold these parts against possibility of displacement.

I wish it understood that the details of construction above set out may be varied without departing from the spirit of the invention, and that features of the invention may be employed without its adoption as an entirety. Thus, while I have shown the reinforcing back as formed of five plies or sections of thin ductile metal, it is obvious that the number of plies and their shape and extension may be varied without departing from the spirit of the invention.

Having thus described my invention, what I claim as new, and desire to secure by Letters Patent, is:

1. A brake shoe comprising a body having a reinforcing back formed of a plurality of plies of ductile metal, one of said plies extending outside the back surface of said body.

2. A brake shoe comprising a body having a reinforcing back formed of a plurality of plies of ductile metal plate integrally connected together and arranged one ply above another, the outermost ply extending across the back of the body.

3. A brake shoe comprising a body having a reinforcing back formed of a plurality of plies of ductile metal folded one ply upon another and having integral walls.

4. A brake shoe comprising a body having a reinforcing back formed of a plurality of plies of ductile metal folded one upon another lengthwise of the back, the outer one of said plies extending completely across the back surface of the body of the shoe.

5. A brake shoe comprising a body having a reinforcing back formed of a plurality of superposed plies of ductile metal and having integral side and end walls.

6. A brake shoe comprising a body having a reinforcing back formed of a plurality of plies of ductile metal, the outermost ply extending across and covering the outer surface of the back of the shoe and the inner plies being connected to and of considerably less width than said outer ply and bent in opposite directions.

7. A brake shoe comprising a body having a reinforcing back formed of a plurality of plies of ductile metal folded one upon another and having integral side walls extending outside the body of the shoe, certain of said plies extending inwardly and at substantially right angles to said side walls and others of said plies extending above and below said plies that extend inwardly from said side walls.

8. A brake shoe comprising a body having a reinforcing back formed of a plurality of plies of ductile metal folded one ply upon another, the outermost ply extending across the center of the body and the inner plies extending to approximately the center of the body, said outermost ply and said inner plies being connected at their outer edges.

9. A brake shoe comprising a reinforcing, pan-shaped back having integral side walls, the portion of the back extending over the body of the shoe being formed of integral, plural plies of ductile metal.

10. A brake shoe comprising a body having a reinforcing back formed of a plurality of plies of ductile metal, the several plies having holes through which the portions of the center attaching lug extend.

11. A brake shoe having a reinforcing back formed of a plurality of plies of ductile metal folded one ply upon another, said back having holes through which pass portions of the end lugs.

12. A brake shoe comprising a body having a reinforcing back formed of a plurality of plies of ductile metal folded one ply upon another and extending lengthwise of the shoe, said back having integral side walls with lips or flanges at their ends to engage the end walls of the back.

13. A brake shoe comprising a body having a reinforcing back formed of a plurality of superposed plies of ductile metal and having center and end lugs interlocked with said back.

14. A brake shoe comprising a body having a pan-shaped, reinforcing back provided with side walls, the portion of the back extending across the body of the shoe being materially heavier than the side walls.

15. A brake shoe comprising a body having a pan-shaped, reinforcing back formed of a plurality of plies of thin ductile metal, the side walls of the back being materially thinner than the aggregate thickness of the plies extending across the body of the shoe.

16. A brake shoe comprising a body having a reinforcing back formed of a plurality of plies of ductile metal folded one ply upon another and having integral side walls, the innermost plies having downwardly turned, outer edges.

17. A brake shoe comprising a body having a pan-shaped, reinforcing back with side and end walls of thin metal extending more than half way from back to front of the body of the shoe, that portion of the reinforcing back extending across the back of the shoe being materially thicker than the side walls of said reinforcing back.

CLIFTON D. PETTIS.

Witnesses:
 GEO. P. FISHER,
 KATHARINE GERLACH.